(12) United States Patent
Thompson et al.

(10) Patent No.: US 11,110,665 B2
(45) Date of Patent: Sep. 7, 2021

(54) SYSTEM AND METHOD FOR DIRECT INFRARED (IR) LASER WELDING

(71) Applicant: Sogefi Engine Systems USA, Inc., Rochester Hills, MI (US)

(72) Inventors: Stephen Thompson, St-Bruno (CA); Yannis Maudet, Orbey (FR); Nuno Demetrio Soeiro, St-Leonard (CA)

(73) Assignee: SOGEFI ENGINE SYSTEMS USA, INC., Rochester Hills, MI (US)

(*) Notice: Subject to any disclaimer, the term of this patent is extended or adjusted under 35 U.S.C. 154(b) by 0 days.

(21) Appl. No.: 15/438,004

(22) Filed: Feb. 21, 2017

(65) Prior Publication Data
US 2017/0157838 A1 Jun. 8, 2017

Related U.S. Application Data

(62) Division of application No. 14/228,347, filed on Mar. 28, 2014, now abandoned.

(51) Int. Cl.
*B29C 65/16* (2006.01)
*B29C 65/00* (2006.01)
(Continued)

(52) U.S. Cl.
CPC ...... *B29C 65/1612* (2013.01); *B29C 65/1632* (2013.01); *B29C 65/1661* (2013.01);
(Continued)

(58) Field of Classification Search
CPC ............ B29C 65/1612; B29C 65/1632; B29C 65/1661; B29C 65/1667; B29C 65/1683; B29C 66/1312; B29C 66/54; B29C 66/73921; B29C 66/934; B29C 66/944; B29C 66/95
See application file for complete search history.

(56) References Cited

U.S. PATENT DOCUMENTS 5,151,149 A * 9/1992 Swartz ............. B29C 66/83411
156/379.8
6,444,946 B1 9/2002 Korte
(Continued)

FOREIGN PATENT DOCUMENTS

DE 202004011497 12/2005
DE 102005024983 2/2006
(Continued)

OTHER PUBLICATIONS

Machine Translation of DE-102005024983-A1 (Year: 2006).*
(Continued)

*Primary Examiner* — Daniel McNally
(74) *Attorney, Agent, or Firm* — Warner Norcross + Judd LLP

(57) ABSTRACT

A method of welding at least two plastic components together is disclosed. The two plastic components are welded together at respective joining surfaces. The method comprises directing at least one infrared (IR) laser beam along the joining surfaces of the at least two plastic components. The IR laser beam heats the joining surfaces of the at least two plastic components to a welding temperature. The method also includes clamping the at least two plastic components together at the joining surfaces to create a weld.

12 Claims, 4 Drawing Sheets

(51) Int. Cl.

| | | |
|---|---|---|
| *B32B 37/00* | (2006.01) | |
| *B32B 37/04* | (2006.01) | |
| *B32B 37/06* | (2006.01) | |
| *B32B 37/18* | (2006.01) | |
| *B32B 37/24* | (2006.01) | |
| *B32B 38/00* | (2006.01) | |
| *B32B 38/18* | (2006.01) | |
| *B29L 31/00* | (2006.01) | |
| *B29K 101/12* | (2006.01) | |

(52) U.S. Cl.
CPC ...... *B29C 65/1667* (2013.01); *B29C 65/1683* (2013.01); *B29C 66/1312* (2013.01); *B29C 66/54* (2013.01); *B29C 66/73921* (2013.01); *B29C 66/934* (2013.01); *B29C 66/944* (2013.01); *B29C 66/95* (2013.01); *B32B 37/0046* (2013.01); *B32B 37/04* (2013.01); *B32B 37/06* (2013.01); *B32B 37/182* (2013.01); *B32B 37/24* (2013.01); *B32B 38/0008* (2013.01); *B32B 38/18* (2013.01); *B29C 65/1677* (2013.01); *B29C 66/71* (2013.01); *B29C 66/712* (2013.01); *B29C 66/863* (2013.01); *B29C 66/919* (2013.01); *B29C 66/9161* (2013.01); *B29C 66/929* (2013.01); *B29C 66/939* (2013.01); *B29K 2101/12* (2013.01); *B29L 2031/7492* (2013.01); *B32B 2037/243* (2013.01); *B32B 2605/08* (2013.01)

(56) References Cited

U.S. PATENT DOCUMENTS

| | | | |
|---|---|---|---|
| 2002/0100540 A1* | 8/2002 | Savitski | B29C 65/1435 156/157 |
| 2003/0141009 A1 | 7/2003 | Landherr et al. | |
| 2006/0000812 A1* | 1/2006 | Weber | B23K 26/03 219/121.61 |
| 2010/0181026 A1* | 7/2010 | Bol | B29C 65/1412 156/350 |
| 2010/0301522 A1* | 12/2010 | Hokoda | B29C 65/1635 264/482 |

FOREIGN PATENT DOCUMENTS

| | | | | |
|---|---|---|---|---|
| DE | 102005024983 A1 * | 2/2006 | ......... | B23K 37/0435 |
| DE | 102006058997 | 6/2008 | | |
| DE | 102006058997 A1 * | 6/2008 | ......... | B23K 26/0884 |
| DE | 102008042663 | 4/2010 | | |
| JP | 2012091400 | 5/2012 | | |
| WO | 03/063940 | 8/2003 | | |

OTHER PUBLICATIONS

Machine Translation of DE-102006058997-A1 (Year: 2008).*
Bachmann, F.G. et al., "Laser Welding of Polymers Using High Power Diode Lasers," *Proc. SPIE*, vol. 4637, pp. 505-518 (2002).
Branson Ultraschall web page, "Infrared Welding," (first publication at least as early as Dec. 2009); retrieved from the internet on Apr. 3, 2015: http://web.archive.org/web/20091208124711/http://www.bransoneurope.eu/products/infrared-welding.
HA Industries, Inc. web page, "Plastic Assembly Processes . . . Optimized," (first publication at least as early as Apr. 2014); retrieved from the internet on Apr. 3, 2015: http://web.archive.org/web/20140413215640/http://www.ha-industries.com/infrared-welding.php.
*Handbook of Plastics Joining, a Practice Guide*, Chapter 9, "Infrared Welding," pp. 97-103, William Andrew Publishing (2008).
Grimm, R.A., Through-Transmission Infrared Welding of Polymers, SPE (ANTEC '96) Conference Proceedings, vol. 1, pp. 1238-1240 (1996).
Kagan, V.A. et al., "Selecting Nylon-Based Plastics for Laser Welding Technology," SAE Technical Paper Series, SAE 2000 World Congress, Detroit, Michigan (Mar. 2000).
Lee, C.S. et al., "Laser Welding of Engineering Plastics," presentation of BASF (Apr. 2007).
Leister Technologies LLC web page, "Laser Welding: Concepts," (2006), retrieved from the internet on Apr. 3, 2015: http://web.archive.org/web/20070430041717/http://www.leisterlaser.com/overview.asp.
LPKF Laser & Electronics, "Laser Plastic Welding—The Latest Evolution in Joining Technology form the Leading System Supplier" (first publication at least as early as Jan. 2012).
Pinho, G.P., "Laser Welding of Thermoplastics," SAE Technical Paper Series, International Body Engineering Conference & Exposition, Detroit, Michigan (Sep. 1999).
Renner, T. et al., "Laser-adapted Construction for Plastic Welding" (Feb. 2004).
ROFIN Worldwide web page, "Laser Polymer Welding" (first publication at least as early as Jul. 2010); retrieved from the internet on Apr. 3, 2015: http://web.archive.org/web/20100711084641/http://www.rofin.com/en/markets/plastic_processing/laser_welding/.
VanEngen, P. et al., "New Advances in Polymer Laser Welding," Laser Welding Handbook, pp. 1-22 (May 2001).
EP, Extended European Search Report, Patent Application No. 15161007.8 (dated Aug. 3, 2015).
U.S. Non-Final Office Action, U.S. Appl. No. 14/228,347 (dated Mar. 17, 2016).
U.S. Final Office Action, U.S. Appl. No. 14/228,347 (dated Sep. 21, 2016).
EP, Office Action, European Application No. 15161007.8 (dated Sep. 28, 2017).
EP, Second Office Action, European Application No. 15161007.8 (dated Mar. 23, 2018).

* cited by examiner

SYSTEM AND METHOD FOR DIRECT INFRARED (IR) LASER WELDING

PRIOR APPLICATION

This is a divisional application of U.S. patent application Ser. No. 14/228,347 filed Mar. 28, 2014.

BACKGROUND OF THE INVENTION

Field of the Invention

The present invention generally relates to direct laser infrared (IR) welding for plastic components. In particular, the present invention is directed to a system and method for joining at least two plastic components together using direct laser IR welding.

Description of the Related Art

In the area of automotive underhood components such as intake manifolds, vibration laser welding is currently the prevalent approach used to join multiple plastic components together. However, alternative welding techniques such as conventional laser welding and infrared (IR) welding may be used as well to join multiple plastic components together. These alternative welding techniques tend to produce higher quality weld joints and offer greater design freedom when compared to vibration welding. Nonetheless, these alternative welding techniques also have drawbacks as well, which limit the applications where they may be used.

In conventional laser welding, a first, optically transparent part and a second, absorbent part are provided, where the first part is positioned above the second part. The first part may be constructed of a transparent polymer that allows for IR energy from a laser beam to pass through. The second part may be treated with a material that acts to absorb the IR energy from the laser beam. For example, in one approach carbon black may be added to the second part to absorb IR energy from the laser beam. The first part and the second part are clamped together, and the IR energy from the laser beam passes through the first part. The IR energy from the laser beam melts an adjacent surface of the second part, which in turn welds the first part and the second part together. However, in conventional laser welding the first part and the second part are each constructed of dissimilar materials (i.e., the first part is constructed of a transparent material and the second part is constructed of a material that absorbs IR energy). Moreover, a direct line of sight should be available through a relatively thin portion of the first part as well. The relatively thin portion of the first part is typically between about one to three millimeters. This requirement provides narrow design constraints, and limits the number of applications where laser welding may be used.

In IR welding, heating elements such as, for example, quartz lamps or a heated filament may be provided to generate heat. The heat may be radiated directly upon the surfaces of the parts that are to be joined to one another. Specifically, the surfaces of the parts to be joined to one another may be melted. The melted surfaces of the parts may then be clamped against one another to create a weld. However, it may be challenging to control the heating elements in order to achieve a constant or uniform temperature along the surfaces of the parts that are joined to one another. Moreover, this problem may be further exacerbated if the parts have relatively complex geometry, as this makes uniform heating along the surfaces more difficult. Finally, the tooling associated with the heating elements may need to be customized depending on the application, which may add cost. Thus, there exists a need for a more cost-effective and flexible approach to weld plastic parts.

BRIEF SUMMARY OF THE INVENTION

In one embodiment, a method of welding at least two plastic components together is disclosed. The two plastic components are welded together at respective joining surfaces. The method comprises directing at least one infrared (IR) laser beam along the joining surfaces of the at least two plastic components. The IR laser beam heats the joining surfaces of the at least two plastic components to a welding temperature. The method also includes clamping the at least two plastic components together at the joining surfaces to create a weld.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
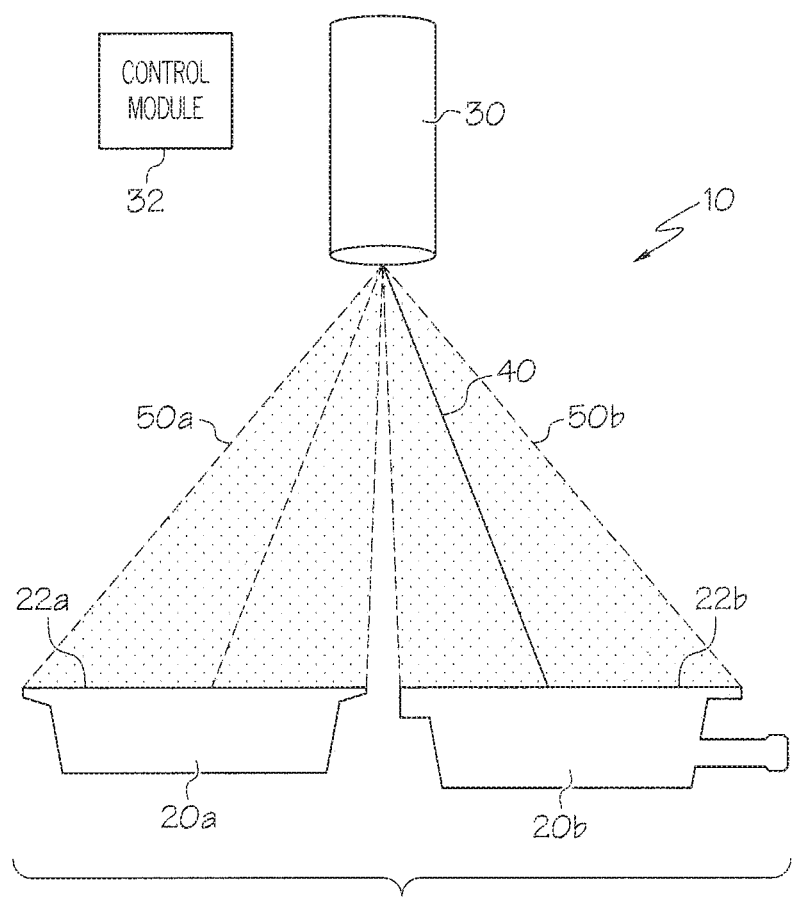
FIG. 1 is a schematic illustration of an exemplary system for heating at least two plastic components together using an IR laser source.

Referring now to the drawings in which like reference numerals indicate like parts, FIG. 1 illustrates an exemplary system 10 for welding at least two plastic components 20a, 20b together at their respective joining surfaces 22a, 22b. The system 10 may include a laser beam source 30 and a control module 32 in operative communication with the laser beam source 30. The laser beam source 30 generates a laser beam 40 operating in the infrared (IR) portion of the electromagnetic spectrum, where a wavelength of the laser beam 40 generally ranges from about 750 nm to about 1 mm. For example, the laser beam source 30 may include a solid-state laser, a diode laser, or a gas laser for generating the laser beam 40. One specific example of a solid-state laser is a fiber laser. In one non-limiting embodiment, the plastic components 20a, 20b may be underhood components in an automotive application.

The control module 32 may refer to, or be part of, an application specific integrated circuit (ASIC), an electronic circuit, a combinational logic circuit, a field programmable gate array (FPGA), a processor (shared, dedicated, or group) that executes code, or a combination of some or all of the above, such as in a system-on-chip. The control module 32 may be used to control the laser beam source 30 in order to direct the laser beam 40 along the joining surfaces 22a, 22b of the plastic components 20a, 20b. In the embodiments as shown in FIGS. 1-6, the laser beam source 30 is based on remote laser welding, which utilizes scanning mirrors (not illustrated) for positioning and moving the laser beam 40 along the joining surfaces 22a, 22b of the plastic components 20a, 20b. However, those skilled in the art will appreciate that other techniques may be used to position the laser beam 40 along the joining surfaces 22a, 22b of the plastic components 20a, 20b as well. For example, in an alternative embodiment, a robot or a Cartesian system may be used for positioning and moving the laser beam 40 along the joining surfaces 22a, 22b of the plastic components 20a, 20b.

The plastic components 20a, 20b may be constructed of any type of thermoplastic polymer such as, but not limited to, polypropylene, polycarbonate, acrylic, nylon, and acrylonitrile butadiene styrene (ABS). In one approach, the plastic components 20a, 20b may be constructed of the same material. Alternatively, in another approach, the plastic components 20a, 20b may be constructed of different materials. In one embodiment, an additive or colorant may be added to material the plastic components 20a, 20b are constructed of, where the colorant is configured to substantially absorb the energy emitted by the laser beam 40. For example, in one embodiment, the colorant may be carbon black. In another embodiment, the additive or colorant may be omitted from the plastic components 20a, 20b. Instead, a coating configured to substantially absorb energy in the IR spectrum (not illustrated) may be applied to the joining surfaces 22a, 22b of the plastic components 20a, 20b. One commercially available example of the coating is sold under the trade name CLEARWELD®, and is manufactured by the Gentex Corporation located in Binghamton, N.Y.

In yet another embodiment, the colorant may be omitted from the plastic components 20a, 20b. Additionally, the coating is not applied to the joining surfaces 22a, 22b of the components 20a, 20b. Instead, the laser beam 40 includes a wavelength of at least about 2000 nm within the IR spectrum. If the laser beam 40 operates at a wavelength of at least 2000 nm, then the plastic components 20a, 20b may be able to substantially absorb the energy emitted by the laser beam 40, even in the absence of the colorant or the coating applied to the joining surfaces 22a, 22b of the plastic components 20a, 20b.

The plastic components 20a, 20b may be held in place using a fixture (not illustrated). In the non-limiting embodiment as shown in FIG. 1, both of the plastic components 20a, 20b are positioned such that the joining surfaces 22a, 22b of the plastic components 20a, 20b generally oppose the laser beam source 30. The control module 32 may be used to scan the laser beam 40 along both the joining surfaces 22a, 22b of the plastic components 20a, 20b. In the exemplary embodiment as shown in FIG. 1, the control module 32 includes control logic or circuitry for controlling the laser beam source 30 to manipulate the laser beam 40 within a first welding area 50a and a second welding area 50b in order to melt the joining surfaces 22a, 22b of the plastic components 20a, 20b.

Figure 2:
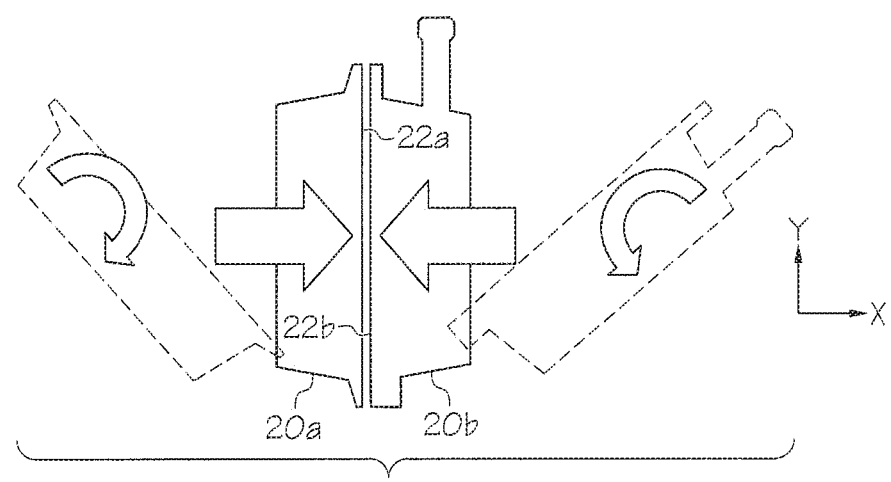
FIG. 2 is a schematic illustration of the two plastic components shown in FIG. 1 being clamped together after sufficient heating.

The laser beam 40 rapidly scans repeatedly over both the joining surfaces 22a, 22b of the plastic components 20a, 20b in a quasi-simultaneous matter in order to sufficiently heat both of the joining surfaces 22a, 22b to a welding temperature at about the same time. Those skilled in the art will appreciate that the laser 40 scans and heats the surfaces 22a, 22b rapidly enough in order to keep the surfaces 22a, 22b at the welding temperature until the plastic components 20a, 20b are clamped together (the clamping is shown in FIG. 2, and is described in greater detail below). For example, in one non-limiting embodiment, the laser beam 40 may repeatedly scan over both the joining surfaces 22a, 22b at a rate of about 50,000 mm/second. This speed of the laser 40 translates into about ten to about two hundred passes per second along the joining surfaces 22a, 22b of the plastic components 20a, 20b, where the exact number of passes may depend on the specific size and geometry of the plastic components 20a, 20b. The welding temperature may vary based on the specific material that the plastic components 20a, 20b are constructed of. The welding temperature may be defined as a temperature at which the plastic components 20a, 20b melt sufficiently so that they may be fused together.

The control module 32 may include control logic for adjusting various welding parameters of the laser beam 40 in order to accommodate the geometry of the joining surfaces 22a, 22b as well as the specific material that the plastic components 20a, 20b are constructed of. Specifically, the welding parameters may control the amount of heat and melting the joining surfaces 22a, 22b may undergo as the laser beam 40 is scanned. Some examples of the welding parameters that the control module 32 may adjust include, but are not limited to, the travel speed of the laser beam 40, the scanning frequency of the laser beam 40, the duration at which the laser beam 40 heats the plastic components 20a, 20b, and a size of the laser focal diameter of the laser beam 40. Additionally, in one embodiment, the laser beam 40 may wobble or quiver slightly as the laser beam 40 melts the joining surfaces 22a, 22b of the plastic components 20a, 20b, which also affects the amount of heat and melting the joining surfaces 22a, 22b may undergo.

Moreover, in one embodiment the welding parameters may also account for any unique features located along the joining surfaces 22a, 22b of the plastic components 20a, 20b. For example, in one embodiment relatively small ribs (not shown) may be positioned along the joining surfaces 22a, 22b of the plastic components 20a, 20b. The ribs may be used to accelerate the melting of the joining surfaces 22a, 22b.

The welding parameters may be adjusted in order to achieve a specific amount of energy per unit of surface area of the joining surfaces 22a, 22b of the plastic components 20a, 20b. The specific amount of energy per unit of surface area generates enough heat for the joining surfaces 22a, 22b to melt sufficiently so that they may be fused together, but at the same time will not cause the plastic components 20a, 20b to overheat and burn. In particular, the specific amount of energy per unit of surface area may generate enough heat so that the joining surfaces 22a, 22b of the plastic components 20a, 20b remain melted as the plastic components 20a, 20b are clamped together to form a weld. The clamping of the plastic components 20a, 20b together to form a weld is described in greater detail below. In one non-limiting embodiment, the average energy per unit of surface area may range from about 0.055 W/mm$^2$ to about 0.5 W/mm$^2$. It should be noted that if excessive energy is delivered to the joining surfaces 22a, 22b, the plastic components 20a, 20b may degrade or burn. For example, if a spot size of the laser beam 40 is relatively small, or if a scanning speed of the laser beam 40 is relatively slow, this may generate excessive energy along the joining surfaces 22a, 22b, which may cause burning. Moreover, if insufficient energy is delivered to the joining surfaces 22a, 22b, then the plastic components 20a, 20b may not be heated to the welding temperature.

Once the joining surfaces 22a, 22b of the plastic components 20a, 20b have been melted, the plastic components 20a, 20b may be clamped together to form a weld. Specifically, referring to FIG. 2, the fixture holding both the plastic components 20a, 20b (not illustrated) may rotate both of the plastic components 20a, 20b by about ninety degrees, and towards one another such that the joining surfaces 20a, 20b face one another along a y-axis of orientation. The fixture (not illustrated) may then clamp the plastic components 20a, 20b together for a predetermined amount of time under a predetermined amount of pressure. In one exemplary embodiment, the plastic components 20a, 20b may be clamped together with between about 1 MPa to about 4 MPa of clamping pressure for about five to twenty seconds. Clamping the plastic components 20a, 20b for the predetermined amount of time under the predetermined amount of pressure creates a weld (not shown) between the two joining surfaces 22a, 22b. Thus, the plastic components 20a, 20b may be welded or joined together in order to create a single, unitary part.

Figure 3:
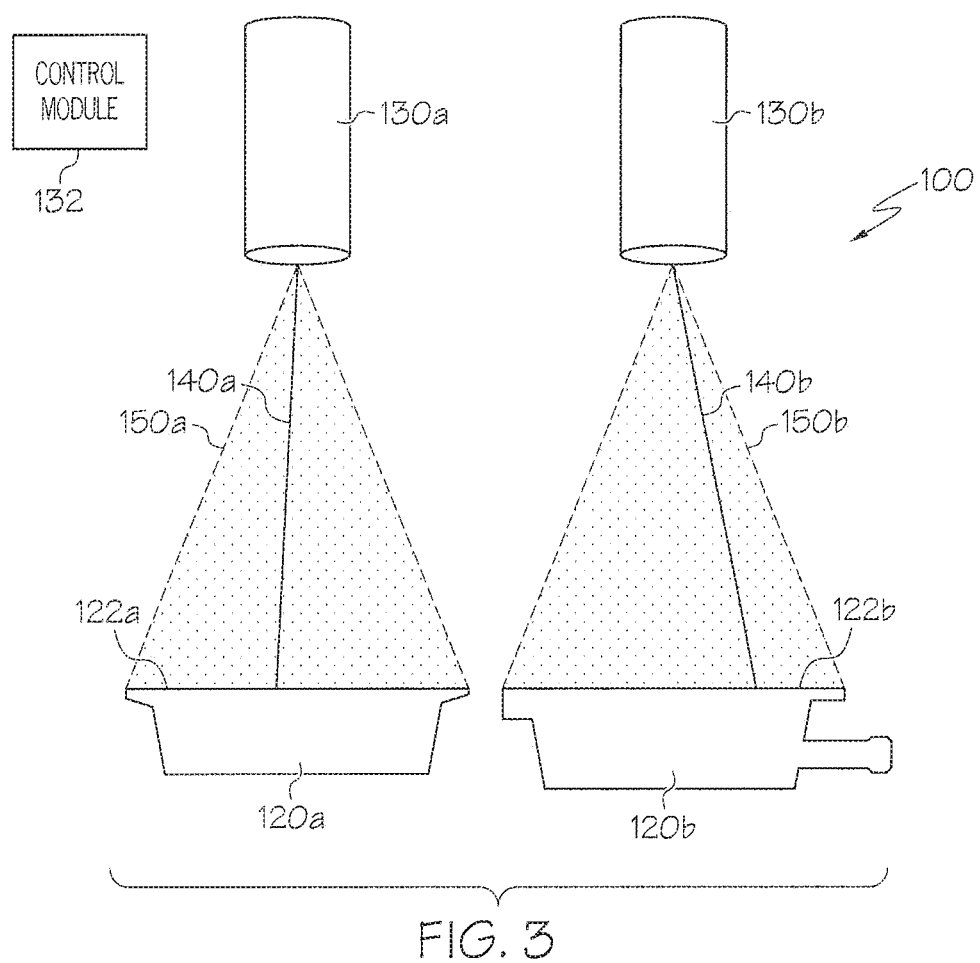
FIG. 3 is a schematic illustration of an alternative embodiment of the system shown in FIG. 1 for heating at least two plastic components together.

In the embodiment as shown in FIG. 1, a single laser beam source 30 is illustrated. However, those skilled in the art will appreciate that the system 10 may utilize more than one laser beam source 30 as well. Turning to FIG. 3, a system 100 having multiple laser beam sources 130a, 130b is illustrated. Specifically, the laser beam source 130a may be used to melt a joining surface 122a of a plastic component 120a. Similarly, the laser beam source 130b may be used to melt a joining surface 122b of a plastic component 120b. Multiple laser beam sources 130 may be especially advantageous if surface areas of the joining surfaces 122a, 122b are relatively large, as a single laser beam may not always be able to scan the joining surfaces 122a, 122b frequently enough in order to melt the joining surfaces 122a, 122b sufficiently to create a weld.

A control module 132 may be in operative communication with both the laser beam sources 130a, 130b. The control module 132 includes control logic or circuitry for controlling the laser beam sources 130a, 130b independently of one another. Specifically, the control module 132 includes control logic or circuitry for controlling the laser beam source 130a to manipulate a laser beam 140a along a first welding area 150a. The laser beam 40 travels within the first welding area 150a in order to heat the joining surface 122a of the plastic component 120a to the welding temperature, thereby melting the joining surface 122a. Simultaneously, the control module 132 also controls the laser beam source 130b to manipulate a laser beam 140b along a second welding area 150b. The laser beam 140b travels within the second welding area 150b in order to heat the joining surface 122b of the plastic component 120b to the welding temperature, thereby melting the joining surface 122b. Thus, both joining surfaces 122a, 122b of the plastic components 120a, 120b may be melted together at the same time.

Once the joining surfaces 122a, 122b of the plastic components 120a, 120b have been melted, the plastic components 120a, 120b may be welded together. Specifically, referring to FIG. 4, the fixture holding both the plastic components 120a, 120b (not illustrated) may rotate both of the plastic components 120a, 120b by about ninety degrees, and towards one another such that the joining surfaces 120a, 120b face one another in the y-axis orientation. The fixture (not illustrated) may then clamp the plastic components 120a, 120b together for the predetermined amount of time under the predetermined amount of pressure.

Figure 4:
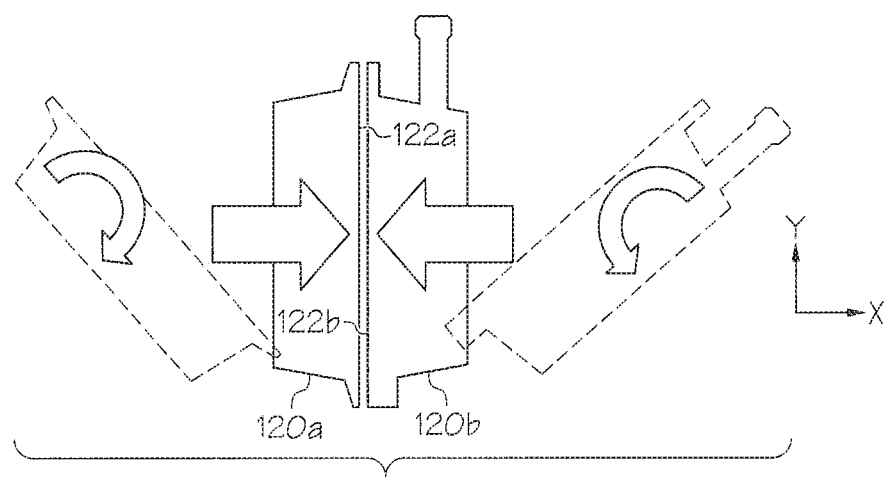
FIG. 4 is a schematic illustration of the two plastic components shown in FIG. 3 being clamped together after sufficient heating.
Figure 5:
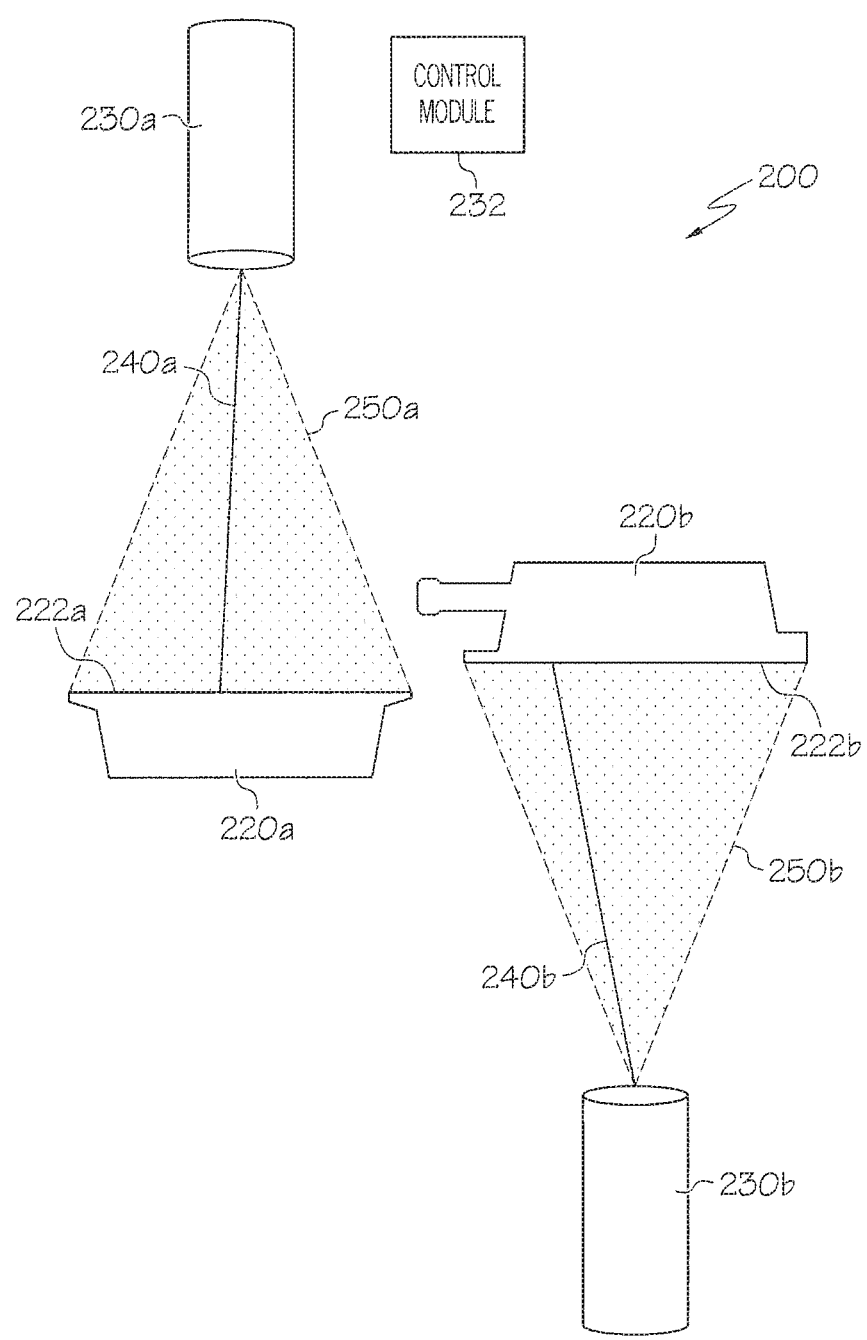
FIG. 5 is a schematic illustration of another embodiment of the system shown in FIG. 1 for heating at least two plastic components together.

Although FIG. 4 illustrates both the laser beam sources 130a, 130b being positioned directly adjacent or side-by-side with one another, it is to be understood that the laser beam sources 130a, 130b may be oriented in other configurations as well. Moreover, although FIG. 4 illustrates the plastic components 120a, 120b positioned side-by-side with one another, with each of the joining surfaces 122a, 122b facing upwardly towards the laser beam sources 130a, 130b, those skilled in the art will appreciate that the plastic components 120a, 120b may be positioned in different orientations as well. Turning to FIG. 5, a system 200 having multiple laser beam sources 230a, 230b is illustrated. A control module 232 may be in operative communication with both the laser beam sources 230a, 230b.

FIG. 5 also illustrates two plastic components 220a, 220b that include respective joining surfaces 222a, 222b. One of the plastic components 220a is oriented in a first position, where the joining surface 222a is positioned in an upwards direction. The remaining plastic component 220b has been rotated by about one hundred and eighty degrees and is oriented in a second position, where the joining surface 222b is positioned in a downwards direction.

The laser beam source 230a is positioned above the joining surface 222a of the plastic component 220a. The laser beam source 230a may be used to heat the joining surface 222a of the plastic component 220a to the welding temperature, thereby melting the joining surface 222a. Specifically, the control module 232 includes control logic or circuitry for controlling the laser beam source 230a to manipulate a laser beam 240a along a first welding area 250a. The laser beam 240a travels within the first welding area 250a in order to heat the joining surface 222a of the plastic component 220a.

The laser beam source 230b is positioned below the joining surface 222b of the plastic component 220b. The laser beam source 230b may be used to heat the joining surface 222b of the plastic component 220b to the welding temperature, thereby melting the joining surface 222b. Specifically, the control module 232 includes control logic or circuitry for controlling the laser beam source 230b to manipulate a laser beam 240b along a second welding area 250b. The laser beam 240b travels within the second welding area 250b in order to melt the joining surface 222b of the plastic component 220b. It should be noted that the laser beam 240a may melt the joining surface 222a of the plastic component 220a simultaneously as the laser beam 240b melts the joining surface 222b of the plastic component 220b.

Figure 6:
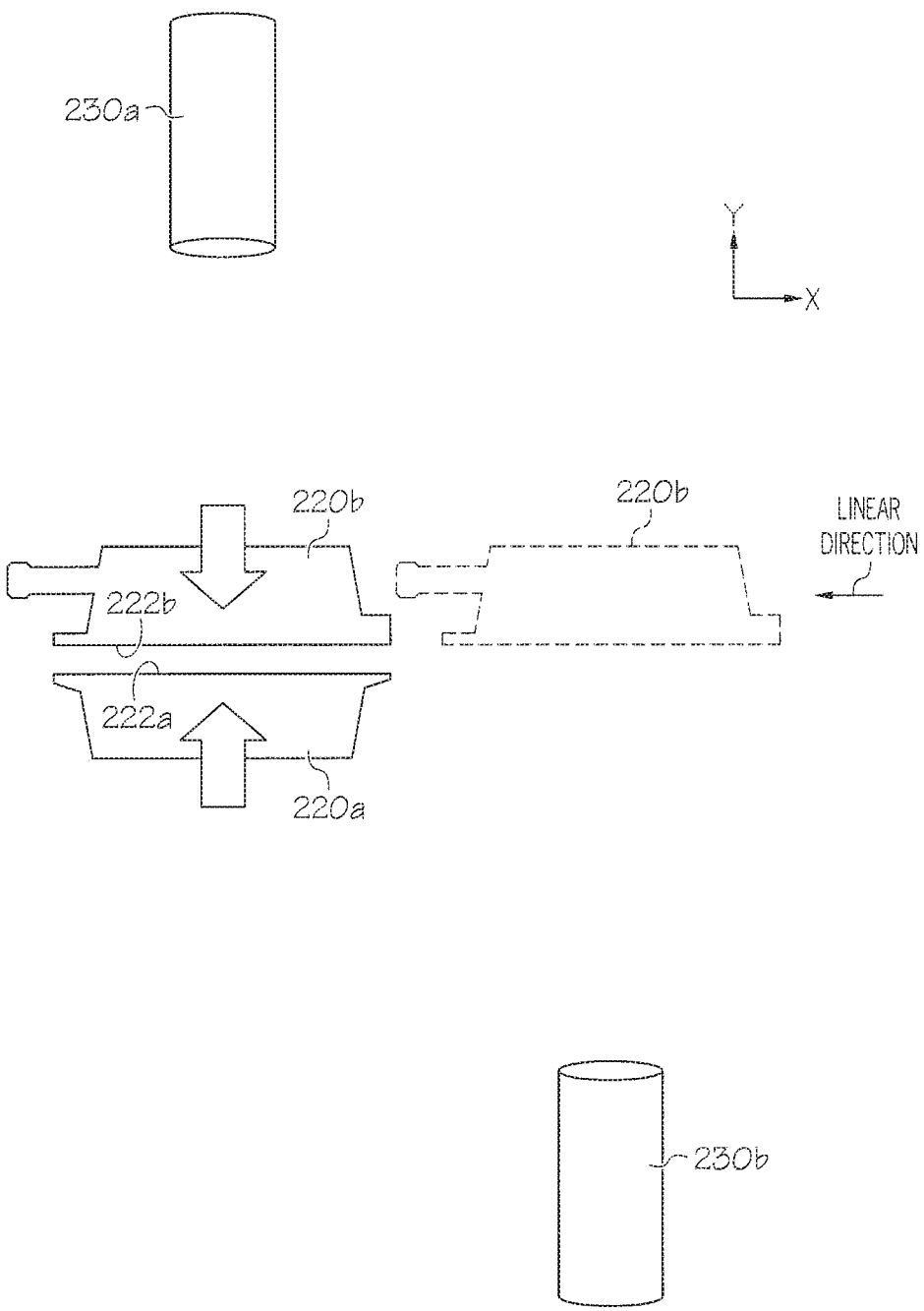
FIG. 6 is a schematic illustration of the two plastic components shown in FIG. 5 being clamped together after sufficient heating.

Once the joining surfaces 222a, 222b of the plastic components 220a, 220b have been melted, the plastic components 220a, 220b may be welded together. Specifically, referring to FIG. 6, the fixture holding both the plastic components 220a, 220b (not illustrated) may translate one or both of the plastic components 220a, 220b in a linear direction towards one another such that the joining surfaces 120a, 120b face one another in an x-axis orientation. For example, in the embodiment as shown in FIG. 6, the plastic component 220b is translated in the linear direction towards the plastic component 220a such that the joining surface 222b of the plastic component 220b generally opposes the joining surface 222a of the plastic component 220a. The fixture (not illustrated) may then clamp the plastic components 220a, 220b together for the predetermined amount of time under the predetermined amount of pressure.

Referring generally to FIGS. 1-6, the disclosed systems each utilize direct IR welding to join at least two plastic components together. Specifically, the disclosed laser beam generated by the IR laser beam source may directly scan and melt respective joining surfaces of the plastic components. In contrast, conventional laser welding typically requires a first, optically transparent part and a second, absorbent part.

The first part may be constructed of a transparent polymer that allows for IR energy from a laser beam to pass through. The second part may be treated with a material that acts to absorb the IR energy from the laser beam. In contrast, the disclosed system does not require two parts constructed of dissimilar materials for welding. Moreover, the disclosed system does not typically require custom tooling for welding, unlike IR welding. The disclosed system may also provide greater control as well as more consistent heating of the joining surfaces of the plastic parts when compared to IR welding.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A method of welding at least two plastic components together, wherein the at least two plastic components are welded together at respective joining surfaces, wherein the at least two plastic components have differing geometries relative to each other, the method comprising:

repeatedly scanning a first infrared (IR) laser beam across one of the joining surfaces and a second IR laser beam across another of the joining surfaces, of the at least two plastic components, wherein the IR laser beams heat each of the joining surfaces of the at least two plastic components to a welding temperature at about the same time;

adjusting at least one welding parameter of at least one of the first and the second IR laser beams to accommodate the differing geometries of the at least two plastic components; and clamping the at least two plastic components together at the joining surfaces to create a weld;

wherein the at least one welding parameter includes at least one of a travel speed of at least one of the first and the second IR laser beams, a scanning frequency of at least one of the first and the second IR laser beams, or a duration at which at least one of the first and the second IR laser beams heats the at least one of the plastic components; and wherein the repeatedly scanning comprises repeatedly scanning at least one of the first and the second IR laser beams across the joining surface areas at a rate of about ten to about two hundred passes per second.

2. The method as recited in claim 1, further comprising positioning ribs along the joining surface areas to accelerate the melting of the joining surface areas.

3. The method as recited in claim 1, comprising controlling a specific amount of energy per surface area created along the joining surface areas of the at least two plastic components.

4. The method as recited in claim 1, comprising rotating both the at least two plastic components by about ninety degrees before clamping.

5. The method as recited in claim 1, comprising translating at least one of the at least two plastic components in a linear direction before clamping such that a first joining surface area of a first plastic component generally opposes a second joining surface area of a second plastic component.

6. The method as recited in claim 1, comprising applying a coating to the joining surface areas of the at least two plastic components.

7. The method as recited in claim 1, comprising adding a colorant to a material the at least two plastic components are constructed of, and wherein the colorant absorbs energy emitted by at least one of the first and the second IR laser beams.

8. The method as recited in claim 1, wherein each of the IR laser beams includes a wavelength of least about 2000 nm.

9. The method as recited in claim 1, wherein at least one of the first and the second IR laser beams are generated by at least one IR laser beam source, and wherein the at least one IR laser beam source is one of a diode laser, a solid-state laser, and a gas laser.

10. The method as recited in claim 1, wherein the at least one welding parameter includes a travel speed of at least one of the first and the second IR laser beams.

11. The method as recited in claim 1, wherein the at least one welding parameter includes a scanning frequency of at least one of the first and the second IR laser beams.

12. The method as recited in claim 1, wherein the at least one welding parameter includes a duration at which at least one of the first and the second IR laser beams heats the at least one of the plastic components.

* * * * *